L. REISFELD.
SAUSAGE LINKING MACHINE.
APPLICATION FILED SEPT. 13, 1919.

1,419,985.

Patented June 20, 1922.

Witness:
Harry S. Gaither

Inventor:
Louis Reisfeld
Sheridan, Jones, Sheridan & Smith
Attys.

L. REISFELD.
SAUSAGE LINKING MACHINE.
APPLICATION FILED SEPT. 13, 1919.
1,419,985.
Patented June 20, 1922.
5 SHEETS—SHEET 2.
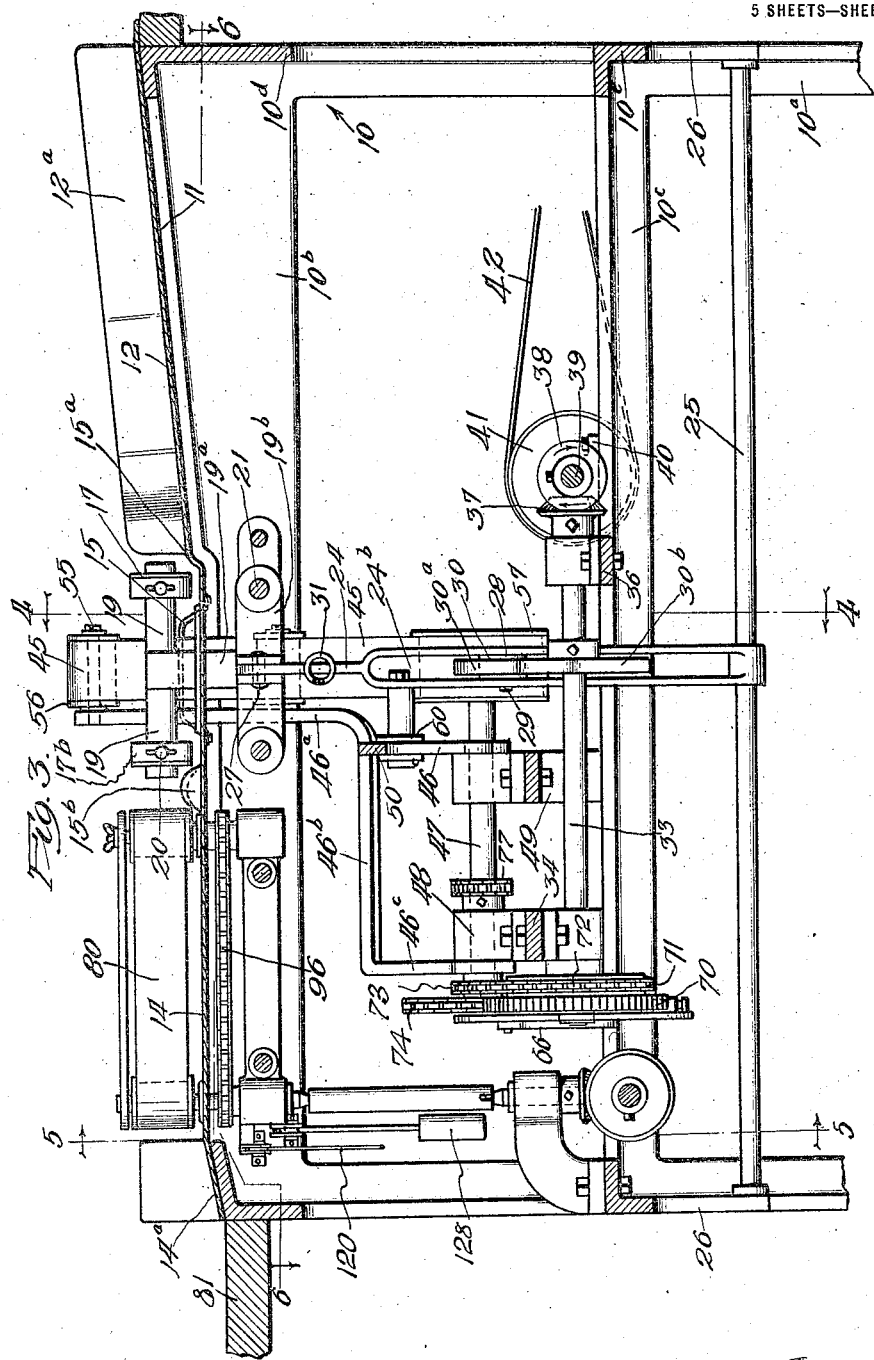
Witness:
Harry S. Gaither
Inventor:
Louis Reisfeld
Sheridan, Jones, Sheridan & Smith
Attys.

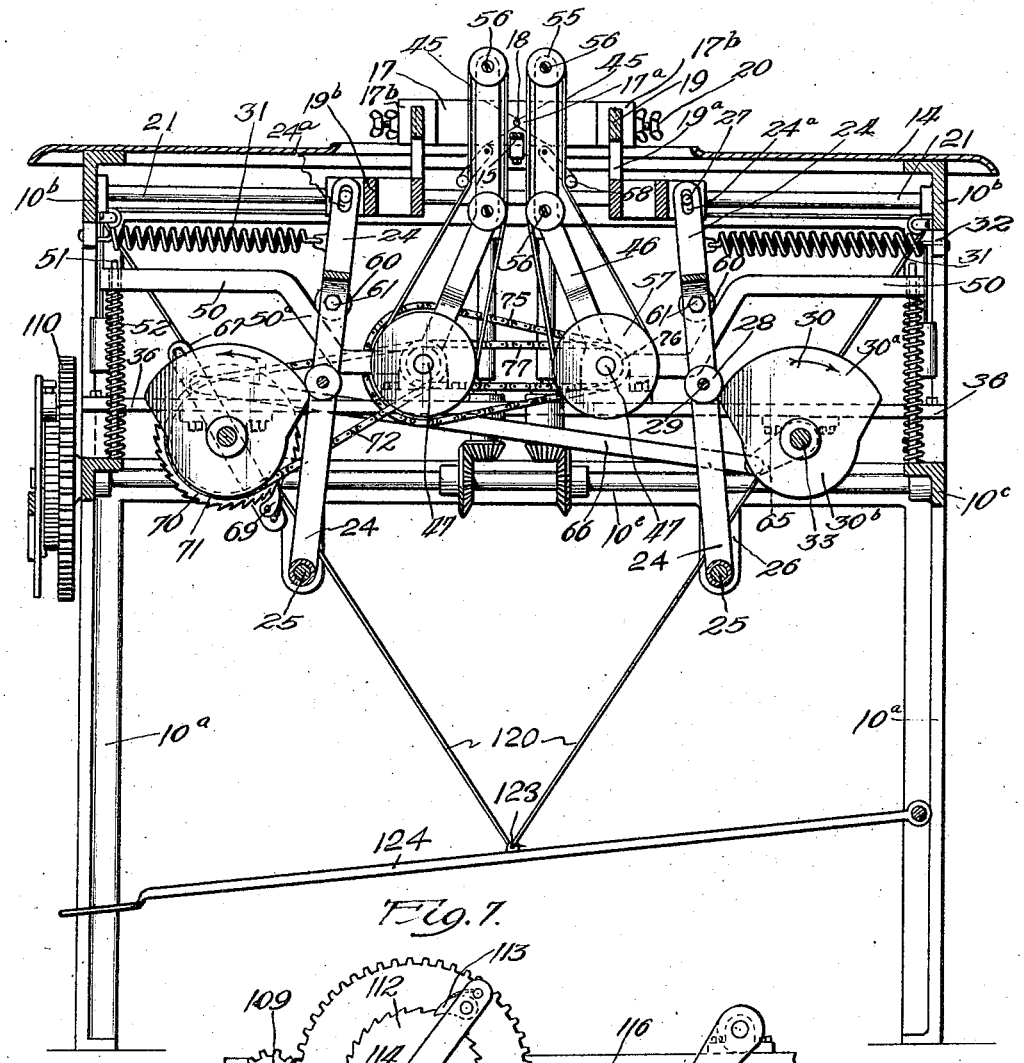
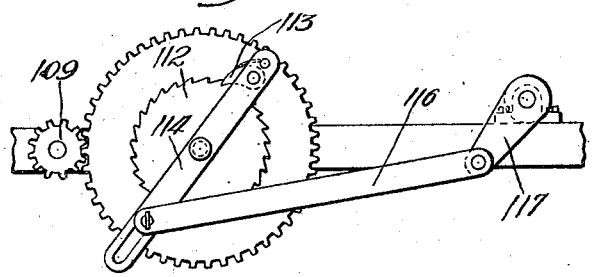

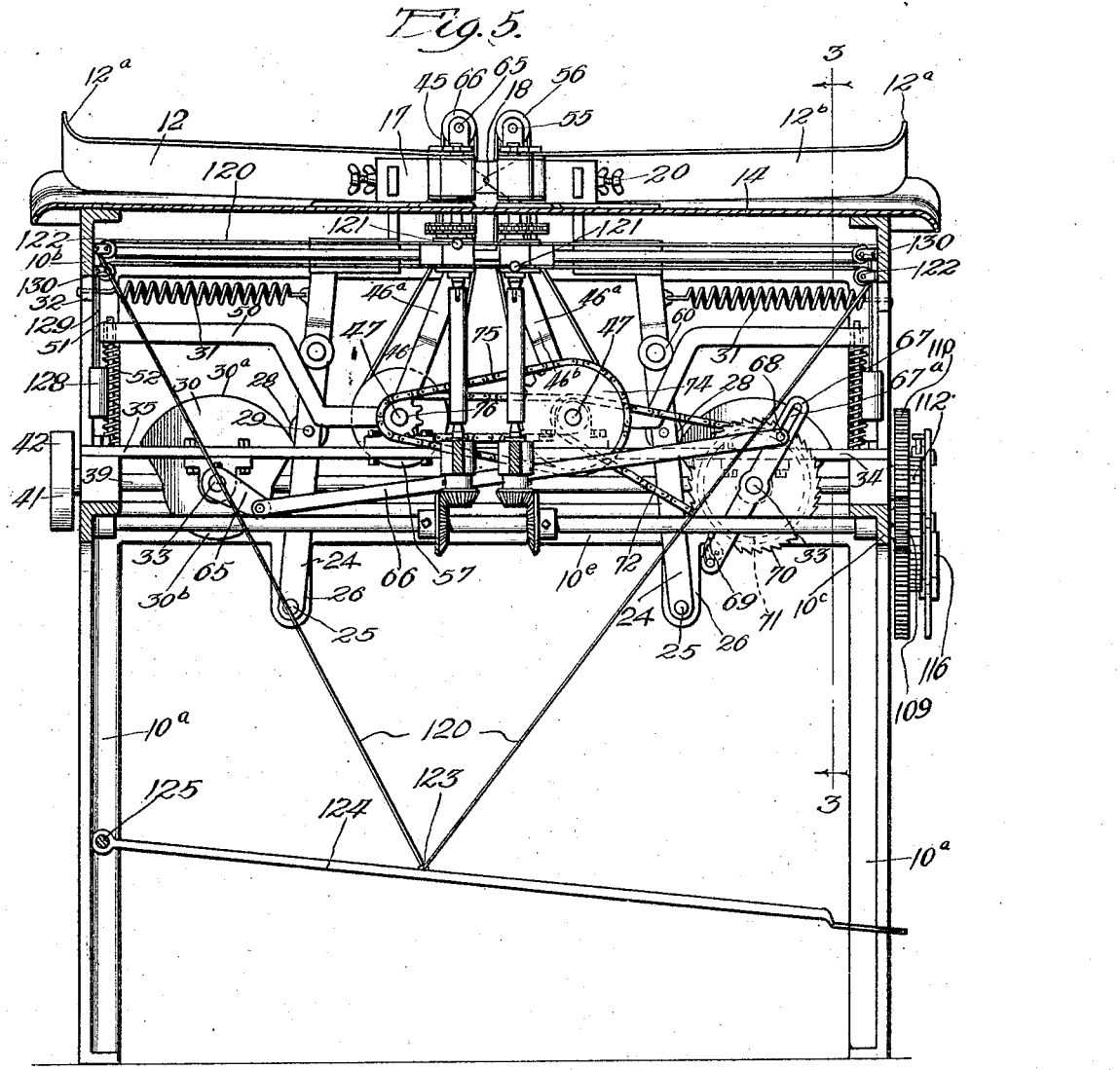

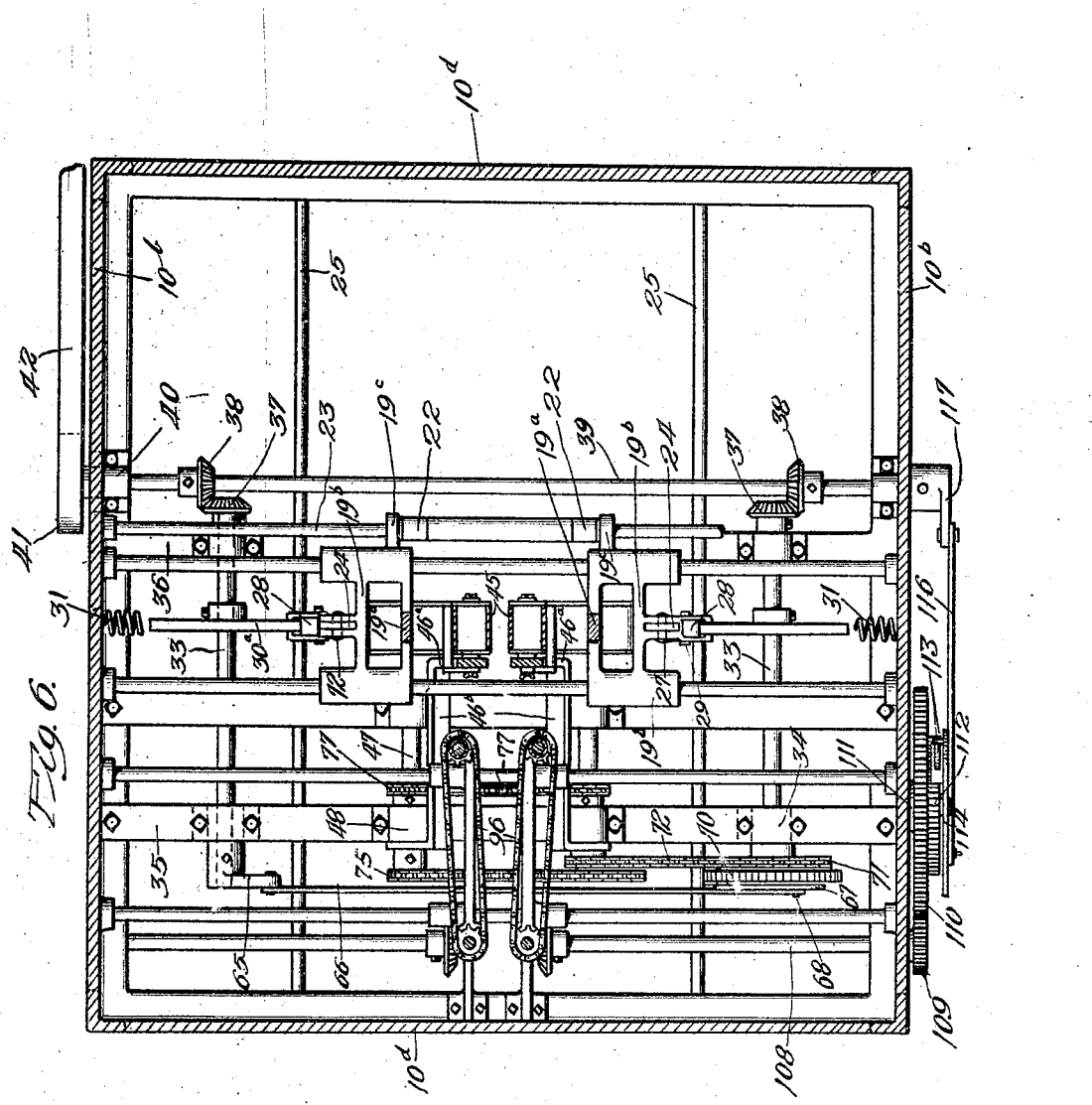

UNITED STATES PATENT OFFICE.

LOUIS REISFELD, OF CHICAGO, ILLINOIS, ASSIGNOR OF ONE-HALF TO FRED DEUTSCH, OF CHICAGO, ILLINOIS.

SAUSAGE-LINKING MACHINE.

1,419,985.  Specification of Letters Patent.  Patented June 20, 1922.

Application filed September 13, 1919. Serial No. 323,608.

*To all whom it may concern:*

Be it known that I, LOUIS REISFELD, a citizen of Hungary, residing at Chicago, in the county of Cook and State of Illinois, have invented certain new and useful Improvements in Sausage-Linking Machines, of which the following is a specification.

This invention relates to a sausage linking machine, and its purpose is to provide improved apparatus adapted to operate upon a filled sausage casing by compressing the same at intervals and twirling the intermediate parts to form separate sausage links. The principal object of the invention is to provide improved apparatus which will operate quickly and efficiently to form a series of sausage links without tearing the casing. Still another object is to provide means for compressing the filled sausage casing and twirling the intermediate portions thereof in combination with means to compensate for variations in the size and strength of the sausage casing. A further object is to provide means for automatically controlling the cycle of operations by which the sausage casing is compressed and twirled. Still another object is to provide improved means for feeding the sausage casing through the compressing and twirling apparatus. Other objects relate to various features of construction and arrangement which will be set out more fully hereinafter.

The nature of the invention will be understood from the following specification taken with the accompanying drawings, in which one embodiment is illustrated.

In the drawings—

Fig. 3 is a longitudinal sectional view on the line 3—3 of Fig. 1;

Fig. 4 is a transverse sectional view on the line 4—4 of Fig. 3;

Fig. 5 is a transverse sectional view on the line 5—5 of Fig. 3;

Fig. 6 is a horizontal sectional view on the line 6—6 of Fig. 3; and

Fig. 7 shows a front elevation of the ratchet mechanism for driving the feeding belts.

Figure 1:
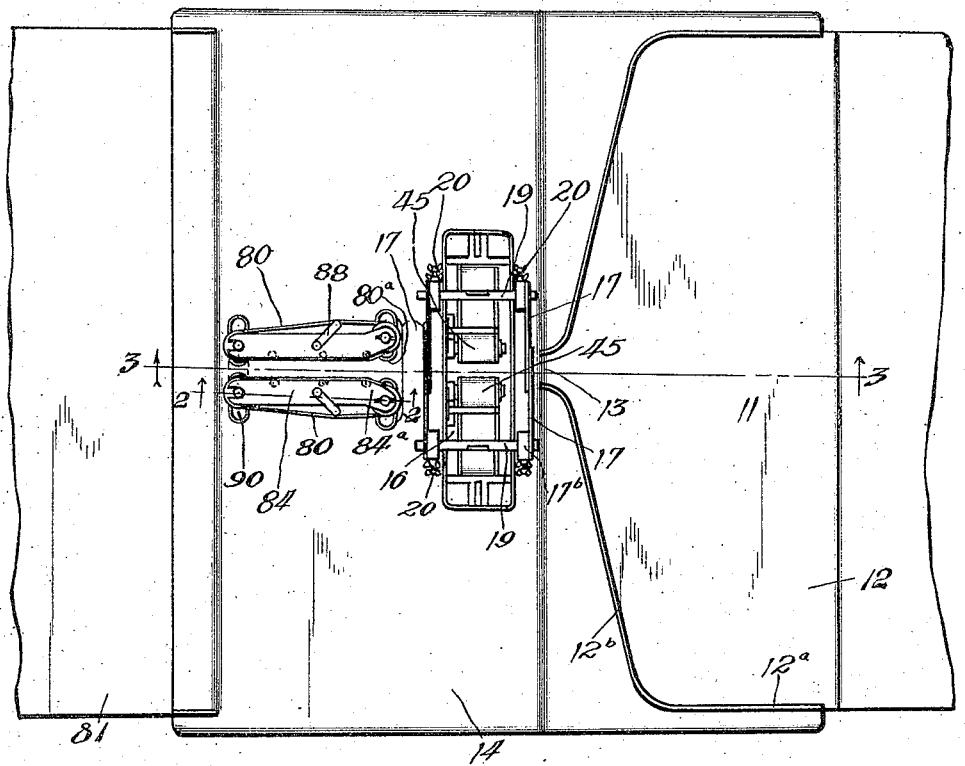
Figure 1 shows a partial top plan view of the machine.

The operating mechanism of the machine is carried by a supporting frame 10 which comprises vertically extending legs $10^a$ at the corners of the machine, upper and lower longitudinal frame members $10^b$ and $10^c$, respectively, along the sides of the frame and end frame members $10^d$ and $10^e$ extending transversely of the machine in alinement with the frame members $10^b$ and $10^c$, respectively. The horizontally extending frame members are angular in cross-section and the lateral flanges of the frame members $10^b$ at one end of the machine are inclined upwardly, as shown at 11, to support a vessel or tray 12 which is adapted to hold the filled sausage casing upon which the machine operates. The tray 12 has longitudinal side walls $12^a$ and end walls $12^b$ which converge toward the center of the machine, being provided with an outlet 13 through which the stuffed sausage casing extends. The tray 12 is preferably constructed of metal and highly polished, so that the sausage casing will be adapted to slide thereover easily. The lower wall of the tray 12 is continued beyond the outlet 13 and forms a substantially flat table top 14 which is inclined downwardly at the opposite end of the table as shown at $14^a$.

After passing through the outlet 13, the stuffed sausage casing is extended across a supporting bracket 15 which is located within an opening 16 in the table 14 and mounted above the level of the table, the bracket being curved in cross-section to conform substantially to the curvature of the outer surface of the casing. While the casing is extended across the opening 16 and supported more or less by the bracket 15, it is adapted to be operated upon by two pairs of compressing blades 17 which are adapted to overlap each other, as illustrated particularly in Fig. 1. The parts of the blades 17 which overlap are provided with V-shaped recesses $17^a$ extending inwardly from their ends and when the two blades of each pair are moved inwardly to their innermost positions, the vertices of these V-shaped recesses are spaced slightly apart to leave an opening 18 through which the compressed sausage casing is adapted to extend. The blades 17 are carried by hubs 17$^b$ which are slidably mounted on rods 19. These hubs 17$^b$ can be secured in the desired adjusted positions on the rods 19 by means of the said screws 20, so that the spaced relation of the two pairs of blades 17 may be varied in order to secure the desired length of sausage links. The transverse arms 19 are carried by upwardly extending posts 19$^a$ which project through the opening 16 in the table and are formed integrally with the horizontally extending brackets 19$^b$ which are adapted to slide transversely of the machine on guide rods 21. The movement of the members 19 is limited to prevent the blades 17 from cutting the casing, by means of rubber bumpers 22 mounted on a rod 23 and arranged to engage ears 19$^c$ on the members 19. The guide rods 21 are rigidly secured to the transverse frame members 10$^b$ at the ends of the machine, and the members 19$^b$ are moved thereon by means of operating levers 24 which are pivoted at their lower ends on rods 25 which extend between the depending arms 26 carried by the end frame members 10$^e$. These levers are provided with elongated holes 24$^a$ at their upper ends which are engaged by pins 27 carried by the members 19$^b$, and the lower portions of these levers are bifurcated, as shown at 24$^b$, thus forming longitudinal slots which are adapted to receive the rollers 28. These rollers are journalled on pins 29 extending between the parallel arms of each lever and are adapted to coact with cams 30 by which the levers are operated to move the compressing blades toward each other. The compressing blades of each pair are normally separated by the action of the coiled springs 31 which are connected to the upper parts of these levers and to the lugs 32 carried by the side frame members 10$^b$. Each cam 30 is provided with a portion 30$^a$ having a relatively large radius which is adapted to project the adjacent lever 24 inwardly by its coaction with the roller 28, and after the portion 30$^a$ of the cam has passed out of engagement with the roller 28, the spring 31 automatically returns the lever 24 to a position wherein the roller will travel upon the portion 30$^b$ of the cam having a reduced radius.

The cams 30 are mounted upon shafts 33 which extend longitudinally of the machine and are journalled in bearings 34 carried by the transverse frame members 35 and 36. One end of each of the shafts 33 carries a relatively fixed bevelled gear 37, and these bevelled gears mesh with other bevelled gears 38 on a transverse shaft 39 which is journalled in bearings 40 carried by the side frame members 10$^c$ and driven through a pulley 41 by a belt 42 which extends to a suitable motor or other driving device. This driving mechanism thus actuates the compressing blades 17 intermittently, so that they compress the sausage casing, hold it compressed for the interval of time during which the intermediate link is twirled, and are then separated to permit the sausage casing to be advanced to a position where a new portion thereof may be compressed by the blades and twirled.

The twirling of the links is effected by means of twirling belts 45, which are carried by twirling frames 46. Each twirling frame 46 comprises an upwardly extending arm 46$^a$, a horizontally extending portion 46$^b$, and a pair of arms 46$^c$ which are spaced apart and journalled on one of the shafts 47 which are mounted in bearings 48 carried by the arms 49 extending upwardly from the side frame members 10$^c$. Each twirling frame 46 also comprises a longitudinally extending controlling arm 50 which is formed integrally with or rigidly secured to the twirling frame adjacent its supporting shaft 47. Each arm 50 includes an inclined cam portion 50$^a$, and the extremity thereof is provided with an aperture adapted to be engaged by a vertical guide rod 51 which extends downwardly and is secured to one of the side frame members 10$^c$. The coiled springs 52 are mounted between the frame members and the arms 50 on the rods 51, and these springs serve normally to rock the twirling frames about the shafts 47 in order to move the twirling belts into engagement with the sausage casing between the pairs of blades 17. The upwardly extending arms 46$^a$ of the twirling frames are inclined inwardly from the shaft 47 and are then extended in a vertical direction parallel to each other, as shown in Fig. 4. Flanged pulleys 55 are mounted on pins 56 at the upper and lower ends of the upright portions of the twirling frames, and flanged driving pulleys 57 are secured to the shafts 47 about which the twirling frames are adapted to tilt. The twirling belts 45 extend around the upper pulleys 55 and around the pulley 57, and coact with the inner sides of the intermediate pulleys 55. The outer stretches of the twirling belts are engaged by the belt tighteners 58 which may be adjusted to regulate the tension of the belts. The twirling frames are operated to move the twirling belts out of engagement with the sausage casing by means of rollers 60, which are mounted on pins 61 extending between the parallel arms of the lever 24, previously described, and arranged to coact with the inclined cam portions 50$^a$ of the controlling arms 50 by which the twirling frames are moved. When the arms 24 are moved away from each other by the springs 31 to the squeezing blades 17 of each pair, the rollers 60 coact with the inclined cam portions 50ª of the levers 50, and thus move the twirling belts away from each other in opposition to the coiled springs 52. When the levers 24 are moved inwardly, the arms 50 are released and are actuated by the springs 52 to cause the twirling belts to engage the sausage casing, the springs 52 preventing the re-bound of the twirling belts after their initial engagement with the casing to be twirled.

The shafts 47, by which the driving pulleys 57 are operated, are driven from one of the shafts 33 by means of a crank 65 which is connected to the end thereof opposite the bevelled gear 37, as shown in Fig. 6. This crank arm is pivotally connected to a connecting rod 66 which extends across the machine and is connected at its other end to an operating lever 67. This lever is provided with a slot 67ª adapted to be engaged by a clamping bolt 68 carried by the end of the connecting rod 66, so that the effective radius of the connecting rod on the lever 67 may be varied as desired. The other end of the lever 67 carries a spring actuated pawl 69 which is adapted to engage a ratchet wheel 70 rotatably mounted upon the projecting end of the other shaft 33. This ratchet wheel has rigidly secured thereto a sprocket gear 71, and this sprocket gear is connected by a sprocket chain 72 with another sprocket wheel 73 rotatably mounted on one of the shafts 47. A larger sprocket gear 74 is rigidly secured to the sprocket gear 73 and a chain 75 connects the larger sprocket gear 74 with a smaller one 76 which is rigidly secured to the other shaft 47. The last-mentioned shaft 47 is connected by other fixed sprocket gears and a chain 77 with the shaft 47 by which the sprocket gears 73 and 74 are carried, so that a driving connection is made with both the shafts 47, the intermediate gears 73 and 74 and the chain 75 being inserted in order to secure the necessary speed of travel of the twirling belts.

Figure 2:
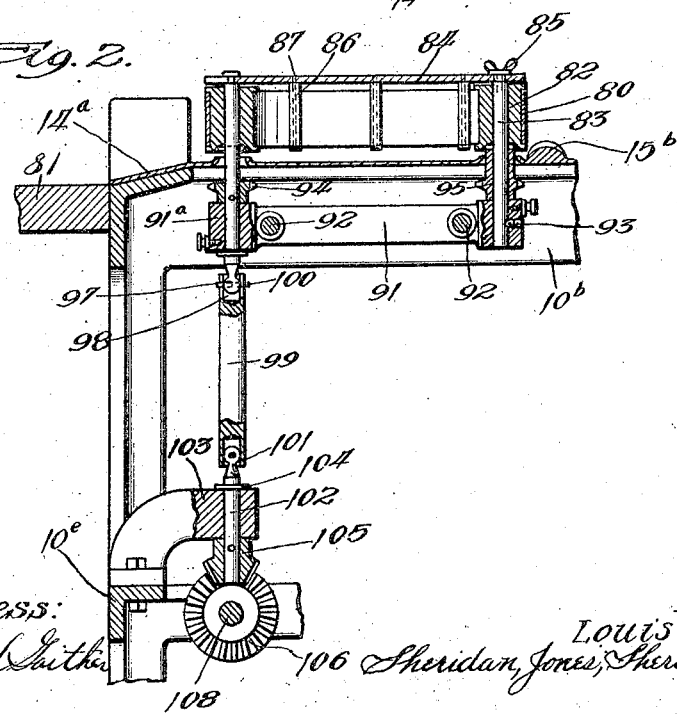
Fig. 2 shows an enlarged detailed sectional view on the line 2—2 of Fig. 1.

After the sausage casing has been restricted by the blades 17 and after the intermediate portion of the casing is twirled, the blades separate and the twirling belts move out of engagement with the stuffed casing by the operation of the mechanism heretofore described, and the casing is then advanced through a distance equal to the length of two sausage links by means of feeding belts 80 which are spaced apart, as shown in Fig. 1, and arranged to receive the stuffed sausage casing between them. After passing between the belts 80, the sausage links pass downwardly over the inclined portion 14ª of the table onto the receiving table 81. The belts 80 are mounted upon rollers 82 which are mounted on vertically extending shafts 83. The shafts 83 are reduced in diameter at their upper ends, and these reduced portions are adapted to engage slots in the plates 84 which extend between the rollers 82 of each belt and are secured in position by means of the clamping screws 85. The plates 84 are projected outwardly at their inner ends, as shown at 84ª, and a series of guiding rollers 86 are mounted upon pins 87 carried along the inner edges of these plates, so that the feeding belts 80 converge inwardly from a point adjacent the restricting blades 17, and thence extend parallel to each other, as shown in Fig. 1. Belt tighteners 88 are carried by the plates 84 and are adapted to engage the reverse stretches of the belt, so that they are maintained in a taut condition. The shafts 83 extend downwardly through elongated slots 90 in the table 14, the metal of the table being projected upwardly around these slots to prevent moisture from getting into the moving parts of the mechanism beneath the table. The shafts 83 are mounted at their lower ends in supporting frames 91 which are adapted to slide on transverse guide rods 92 which extend between the side frame members 10ᵇ. One of the shafts 83 of each pair is rigidly secured to its supporting frame 91 by means of a set-screw 93, and the other shaft 83 is rotatably mounted in a bearing 91ª, as shown in Fig. 2. The two shafts 83 of each pair are connected by sprocket gears 94 and 95 through an intermediate sprocket chain 96, the sprocket gear 94 being secured to its shaft to prevent downward movement thereof in its bearing. The lower end of the last-mentioned shaft 83 is provided with a spherical extremity 97 which loosely engages a cylindrical recess 98 in the upper end of a coupling 99. A transverse pin 100 extends through the extremity 97 and engages slots in the walls of the recess 98 in order to form a flexible driving connection between the coupling and the shaft. A similar connection 101 is formed between the lower end of the coupling 99 and a vertical driving shaft 102 which is journalled in a bracket 103 carried by the end frame member 10ᵉ. The shaft 102 is held against vertical movement by a collar 104, and the lower end thereof carries a bevelled gear 105 which is adapted to mesh with another bevelled gear 106 secured to the shaft 108. The shaft 108 is journalled in bearings carried by the frame members 10ᵉ and is driven by a gear 109 secured to the projecting end thereof. This gear in turn meshes with a larger driving gear 110 which is journaled on a stub shaft 111 carried by the frame member 10ᶜ. The gear 110 has secured thereto a ratchet wheel 112 which is driven by a pawl 113 mounted on one end of a lever 114. The other end of the lever 114 has an adjustable connection with a connecting rod 116, which is pivoted at its other end to a crank arm 117 mounted on the projecting end of the shaft 39 by which the shafts 33 are driven. The point of attachment of the connecting rod 116 on the operating lever 114 can be varied in order to regulate the degree of rotation of the ratchet wheel with each rotation of the crank arm 117, thereby adjusting the amount of travel of the feeding belts 80 upon each rotation thereof.

The supporting frames 91 are adapted to be separated on the guide rods 92, at the will of the operator, by means of flexible members 120 which are connected to pins 121 carried by the frames 91, and extended in opposite directions therefrom around rollers 122 carried by the side frame members 10$^b$. After passing around the rollers 122, the flexible members 120 extend downwardly and are secured at 123 to an intermediate portion of a foot-lever 124 which is pivoted on the frame at 125. When this lever or pedal is depressed, the frames 91 are separated, thus moving the shafts 83 in the slots 90 and separating the feeding belts 80. This separation of the frames 91 and of the feeding belts carried thereby without disturbing the driving connection is permitted by means of the flexible driving connections which are established through the couplings 99. The weight of the foot lever 124 is counter-balanced by the counter-weights 128 which are suspended at the ends of flexible cords 129 which extend around pulleys 130 carried by the side frame members 10$^b$, and are then attached to the pins 121 on the sides thereof opposite the connections of the flexible members 120. The separation of the feeding belts through the operation of the lever 124 is thus normally opposed by the counter-weights 128 which hold the belts in contact with the casing.

In the operation of the machine, the filled sausage casing is placed within the container with one end thereof projecting through the outlet opening 13. By pressing on the pedal 124, the operator is able to separate the feeding belts 80 and the projecting end of the sausage casing is then placed between these belts. Upon releasing the pedal, the belts move toward each other and into engagement with the opposite sides of the sausage casing so that upon the movement of the belts the sausage casing is withdrawn from the container 12 across the supporting member 15 which engages the under side of the casing between the blades 17. When the parts 30$^a$ of the cams 30 pass into engagement with the rollers 29, the levers 24 are moved inwardly to actuate the members 19 by which the blades 17 are carried. This causes the blades 17 to close upon each other, thereby constricting the sausage casing at two points which are separated by the distance between the two pairs of blades. It will be understood that this operation of constricting the casing takes place while the feeding belts 80 are at rest. If the blades 17 have been moved together, the rollers 29 travel upon the parts 30$^a$ of the cams while the cams continue to rotate, the blades being thereby held in the constricting position, while the twirling operation takes place. While the blades 17 are thus held stationary in the constricting position, the twirling belts 45 engage opposite sides of that portion of the casing which lies between the two pairs of blades on the support 15. The movement of the belts into twirling position is brought about automatically by the springs 52, when the rollers 60 travel inwardly with the levers 24, and the parts are so proportioned that the twirling belts engage the sausage link immediately after the constricting operation has been completed. As soon as the belts engage the sausage link, the lever arm 66 is actuated by one of the shafts 32 to operate the crank arm 67 which moves the ratchet wheel 70 through the action of the pawl 69. This rotation of the ratchet wheel, being multiplied by the connected sprocket gears and chains, is transmitted to the shafts 47 by which the twirling belts are driven. The movement of the ratchet wheel and the consequent twirling of the sausage link is completed while the rollers 29 are traveling on the part 30$^a$ of the cams and these rollers then pass inwardly on to the parts 30$^b$ of the cams at the same time that the constricting blades 17 are separated by the action of the springs 31. The twirling of one link has then been completed, and the feeding belts 80 then begin to operate to carry the sausage casing forward to a new position. The amount of this movement is equal to the length of two sausage links, since it is obviously necessary to twirl every second link only in order to secure a permanent separation between each link and those adjacent to it. The forwarding belts are brought into operation by the action of the crank arm 117 mounted on the shaft 39. This crank arm operates the connecting rod 116 which drives the ratchet wheel 112 through the lever 114 and the pawl 113. The ratchet wheel 112 drives the gears 110 and 109 and the latter gear drives the shaft 108 which carries the bevel gears 106. The bevel gears operate the vertical shafts 102 and the spindles 83 which drive the feeding belts. The crank arm 117 is arranged to actuate this mechanism during the time that the rollers 24 are in engagement with the part 30$^b$ of the cams. The distance that the sausage casing is moved by the twirling belts during each operation thereof will depend upon the connection between the connecting rod 116 and the lever 114 and this connection may be varied in order to vary the rotation of the ratchet wheel 112. In this way the distance that the sausage casing travels can be regulated so that it will equal twice the distance between the pairs of blades 17. It will be understood that the blades 17 can be adjusted on the supporting member 19 in order to vary the length of the sausage links. It will be noticed that a ridge 15ª is provided in the table at the outlet 13 and a rib 15ᵇ is provided on the upper surface of the table at the other side of the blades 17. These parts 15ª and 15ᵇ are adapted to hold the sausage casing above the surface of the table adjacent each pair of blades 17 so that the blades will slide under the casing as the latter enters the notches 17ª. The feeding belts 80 are mounted so that they diverge at their forward ends as shown at 80ª, thereby effecting a gradual compression of the casing by the belts.

Although I have shown and described one embodiment of the invention for purposes of illustration, it will be understood that it may be constructed in various other forms without departing from the scope of the appended claims.

I claim:

1. In a sausage linking machine, a container for a stuffed sausage casing, means for drawing said casing from said container and putting it under tension, and means interposed between said container and said drawing means for constricting said casing at two points.

2. In a sausage linking machine, a container for a stuffed sausage casing, means for constricting said casing at two points, means located on the opposite side of said constricting means from said container for drawing said sausage casing from said container and creating tension therein in the region in which it is constricted, and means for twirling said casing between the constricted points.

3. In a sausage linking machine, a container for a stuffed sausage casing, feeding means engaging said casing for drawing it from said container and creating tension therein, means for operating said feeding means intermittently, twirling means arranged to operate on said casing between said container and said feeding means, and means for operating said twirling means intermittently in alternation with said feeding means.

4. In a sausage linking machine, a container for a stuffed sausage casing, feeding means engaging said casing for drawing it from said container and creating tension therein, means for operating said feeding means intermittently, twirling means arranged to operate on said casing between said container and said feeding means, means for operating said twirling means intermittently in alternation with said feeding means, means for constricting the sausage casing on opposite sides of said twirling means, and means for operating said constricting means intermittently in alternation with said feeding means.

5. In a sausage linking machine, a container provided with a smooth inner surface and having an outlet opening, feeding means for engaging a stuffed sausage casing and drawing the same from said container through said opening and thereby putting it under tension adjacent said container, means for supporting said casing between said container and said feeding means, and twirling means adapted to engage and twist said casing while on said supporting means.

6. In a sausage linking machine, a container for a stuffed sausage casing, feeding means for withdrawing said casing from said container, constricting blades arranged in pairs, means for moving the constricting blades of each pair toward each other to constrict said casing, means for twirling the casing between the pairs of said blades to form a sausage link, and means to vary the distance between said pairs of blades.

7. In a sausage linking machine, a container for a stuffed sausage casing, feeding means for withdrawing said casing from said container, constricting blades arranged in pairs, means for moving the constricting blades of each pair toward each other to constrict said casing, means for twirling the casing between the pairs of said blades to form a sausage link, means to vary the distance between said pairs of blades, means to operate said feeding means in alternation with said constricting means, and means to vary the operation of said feeding means to maintain an intermittent travel of said casing through a distance equal to twice the length of the sausage link.

8. In a sausage linking machine, a container for a stuffed sausage casing, feeding means for withdrawing said casing from said container, constricting blades arranged in pairs, means for moving the constricting blades of each pair toward each other to constrict said casing, means for twirling the casing between the pairs of said blades to form a sausage link, means to vary the distance between said pairs of blades, means to operate said feeding means in alternation with said constricting means, means to vary the operation of said feeding means to maintain an intermittent travel of said casing through a distance equal to twice the length of the sausage link, and means to adjust the operation of said twirling means to vary the number of rotations imparted to each link.

9. In a sausage linking machine, a supporting table having an aperture therethrough, a container mounted at one side of said aperture and having an outlet opening therein, feeding means mounted on said table at the other side of said aperture for engaging a stuffed sausage casing and withdrawing the same through said opening across said aperture, means mounted in said aperture for engaging the under side of said casing, means extending upwardly through said aperture for engaging the stuffed sausage casing to constrict the same, and means mounted beneath said table for operating said constricting means.

10. In a sausage linking machine, a supporting table having an aperture therethrough, a container mounted at one side of said aperture and having an outlet opening therein, feeding means mounted on said table at the other side of said aperture for engaging a stuffed sausage casing and withdrawing the same through said opening across said aperture, means mounted in said aperture for engaging the under side of said casing, supporting members extending upwardly through said aperture, constricting blades mounted in pairs on said supporting members, and means for moving said supporting members to cause said blades to engage said casing.

11. In a sausage linking machine, a supporting table having an aperture therethrough, a container mounted at one side of said aperture and having an outlet opening therein, feeding means mounted on said table at the other side of said aperture for engaging a stuffed sausage casing and withdrawing the same through said opening across said aperture, means mounted in said aperture for engaging the under side of said casing, supporting members extending upwardly through said aperture, constricting blades mounted in pairs on said supporting members, means for moving said supporting members to cause said blades to engage said casing, and means for limiting the inward movement of said supporting members.

12. In a sausage linking machine, a supporting table having an aperture therethrough, a container mounted at one side of said aperture and having an outlet opening therein, feeding means mounted on said table at the other side of said aperture for engaging a stuffed sausage casing and withdrawing the same through said opening across said aperture, means mounted in said aperture for engaging the under side of said casing, supporting members extending upwardly through said aperture, constricting blades mounted in pairs on said supporting members, means for moving said supporting members to cause said blades to engage said casing, and means for adjusting the spaced relation of the blades on each supporting member.

13. In a sausage linking machine, a pair of supporting members, constricting blades mounted adjustably on said supporting members, means tending normally to move said supporting members away from each other, and means operating in opposition to said last named means for intermittently moving said supporting members toward each other.

14. In a sausage linking machine, a pair of supporting members, constricting blades adjustably mounted on said supporting members, means tending normally to move said supporting members away from each other, means operating in opposition to said last named means for intermittently moving said supporting members toward each other, twirling means mounted between the blades carried by said supporting members, and means for operating said twirling means.

15. In a sausage linking machine, a pair of supporting members, constricting blades mounted in pairs on said supporting members for engaging a stuffed sausage casing, operating members connected to said supporting members, and cams actuating said operating members for intermittently moving said supporting members toward each other to constrict said sausage casing by the operation of said blades.

16. In a sausage linking machine, a pair of supporting members, constricting blades mounted in pairs on said supporting members for engaging a stuffed sausage casing, operating members connected to said supporting members, cams actuating said operating members for intermittently moving said supporting members toward each other to constrict said sausage casing by the operation of said blades, and means for varying the operation of said last named means.

17. In a sausage linking machine, a pair of supporting members, constricting blades mounted in pairs on said supporting members for engaging a stuffed sausage casing, operating members connected to said supporting members, cams actuating said operating members for intermittently moving said supporting members toward each other to constrict said sausage casing by the operation of said blades, twirling belts mounted on opposite sides of said casing between said pairs of blades, means tending normally to move said twirling belts into engagement with said casing, means controlled by said cams for permitting the movement of said belts into engagement with said casing only after said casing has been constricted by said blades, and means for operating said twirling belts.

18. In a sausage linking machine, a pair of endless feeding belts arranged parallel to each other, vertical shafts upon which said feeding belts are mounted, means for rotating said shafts, and means for displacing said shafts horizontally to vary the separation of said belts.

19. In a sausage linking machine, a pair of endless feeding belts extending horizontally parallel to each other, rollers upon which said belts are mounted, vertical spindles upon which said rollers are mounted, flexible couplings connected to said spindles, vertical driving shafts connected to said couplings, supporting means for said spindles, and means for shifting said supporting means to vary the separation of said spindles and the distance between said belts.

In testimony whereof, I have subscribed my name.

LOUIS REISFELD.